Patented Apr. 20, 1937

2,077,628

UNITED STATES PATENT OFFICE 2,077,628

MOTORCYCLE

Le Grand L. Jordan, Los Angeles, Calif.

Application July 25, 1935, Serial No. 33,115

11 Claims. (Cl. 180—33)

My invention relates to motor cycles and it has as its main object to provide a new and improved design for motor cycles in which road and motor vibration are reduced materially; sidewise thrust or torque is eliminated; the chain drive, with all of its objections, is replaced by a practical shaft drive; the cooling of the motor is made more effective; an improved starter connection is provided, making possible a quicker getaway; and a more balanced and efficient machine is produced, particularly designed for the exacting requirements of the motor cycle officer.

In order to make possible these improvements and advantages, among the salient structural features of design and arrangement are the following:

A four cylinder engine is used, with the cylinders arranged in pairs, one pair at each side of the median line of the structure, the cylinders of each pair being placed one behind the other longitudinally of the frame, thus forming a balanced power plant, and making possible greater cooling efficiency.

A drive shaft in alignment with the axis of one of the crank shafts of the motor, and in parallel relationship with the median line of the structure, with the clutch, transmission and universal joint all in straight alignment and parallel with the longitudinal dimension of the frame structure.

A starter shaft in alignment with the axis of the other crank shaft of the motor, which starter shaft is also connected to drive the magneto and a generator, said starter shaft being also in parallel relationship with the drive shaft and with the median line of the entire structure.

A structure in which all of the operating parts, including the drive shaft, are inclosed in a suitable housing, thus eliminating the serious objection of throwing grease and oil from the operating parts, and at the same time making a machine which is much cleaner and less noisy.

The provision of a jointed frame structure, that is, the rear fork is pivoted at the transverse axis of the universal joint, so that the rear end of the motor cycle absorbs the road shock more effectively than where the entire structure vibrates and jumps in a way to seriously reduce the traction of the rear wheel with the ground, my improved arrangement making it possible for the rear wheel to maintain a better traction and thus make for greater safety.

The provision of twin crank shafts, geared together and rotating in opposite directions, makes it possible to entirely eliminate the sidewise thrust or torque, and at the same time the vibration caused thereby is materially lessened.

In order to illustrate my invention more fully, I have shown on the accompanying two sheets of drawings a motor cycle structure which embodies my invention, which I will now describe in detail.

Figure 1:
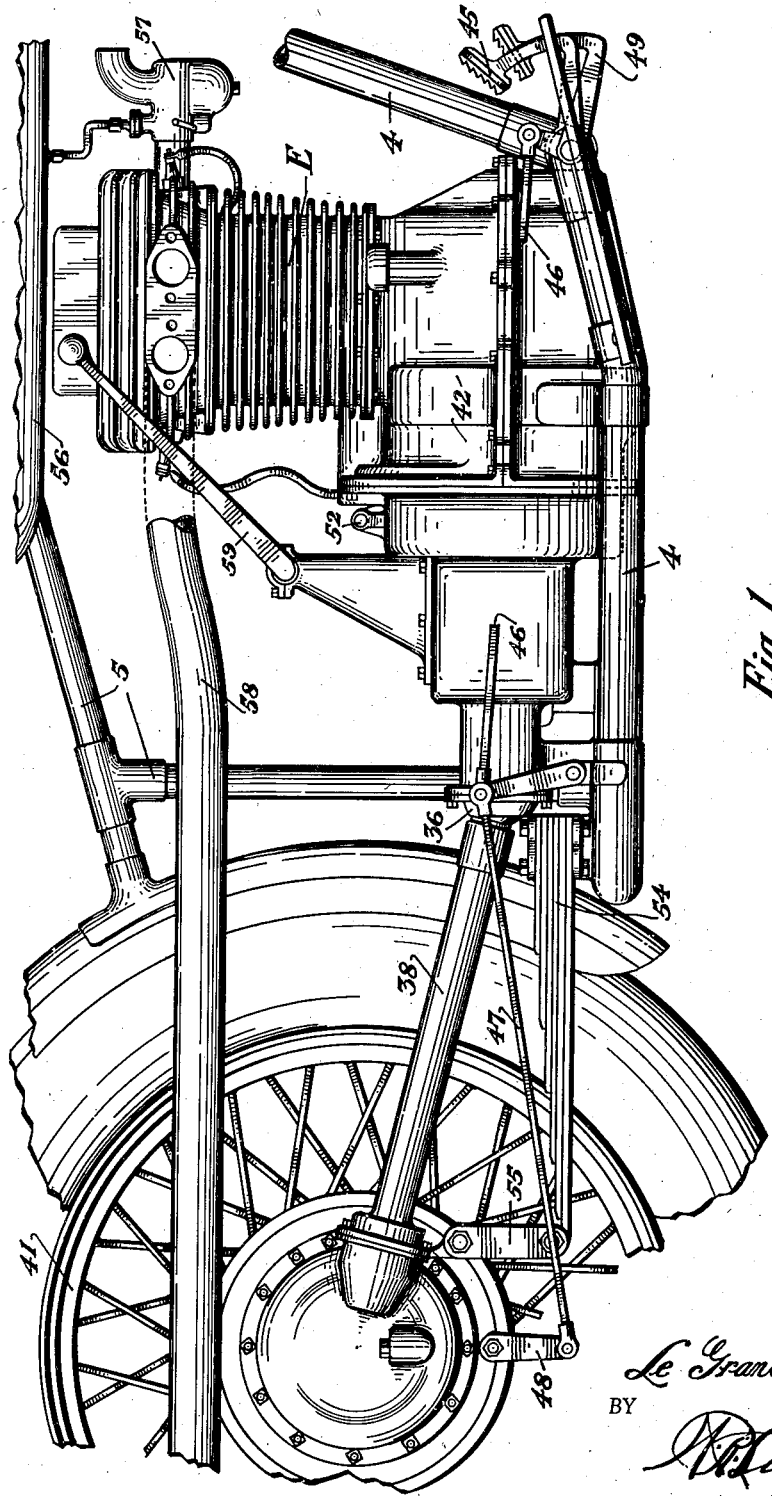
Figure 1 is a fragmentary side elevation of a motor cycle embodying my invention, only those parts being shown which have to do with the invention.

Referring now more in detail to the drawings, the frame structure can be of the usual type with such modifications as may be necessary or convenient to best hold the power plant and its driving connections. As indicated, the frame is made of tubular steel members welded or otherwise secured together to give strength and rigidity in properly supporting the power plant, but it will be understood that pressed steel construction can also be used advantageously.

In the showing here made, the reference numeral 4 is used to designate the lower frame members upon which the engine or power plant is supported, while the reference numeral 5 designates the upper frame members.

Figures 2, 3:
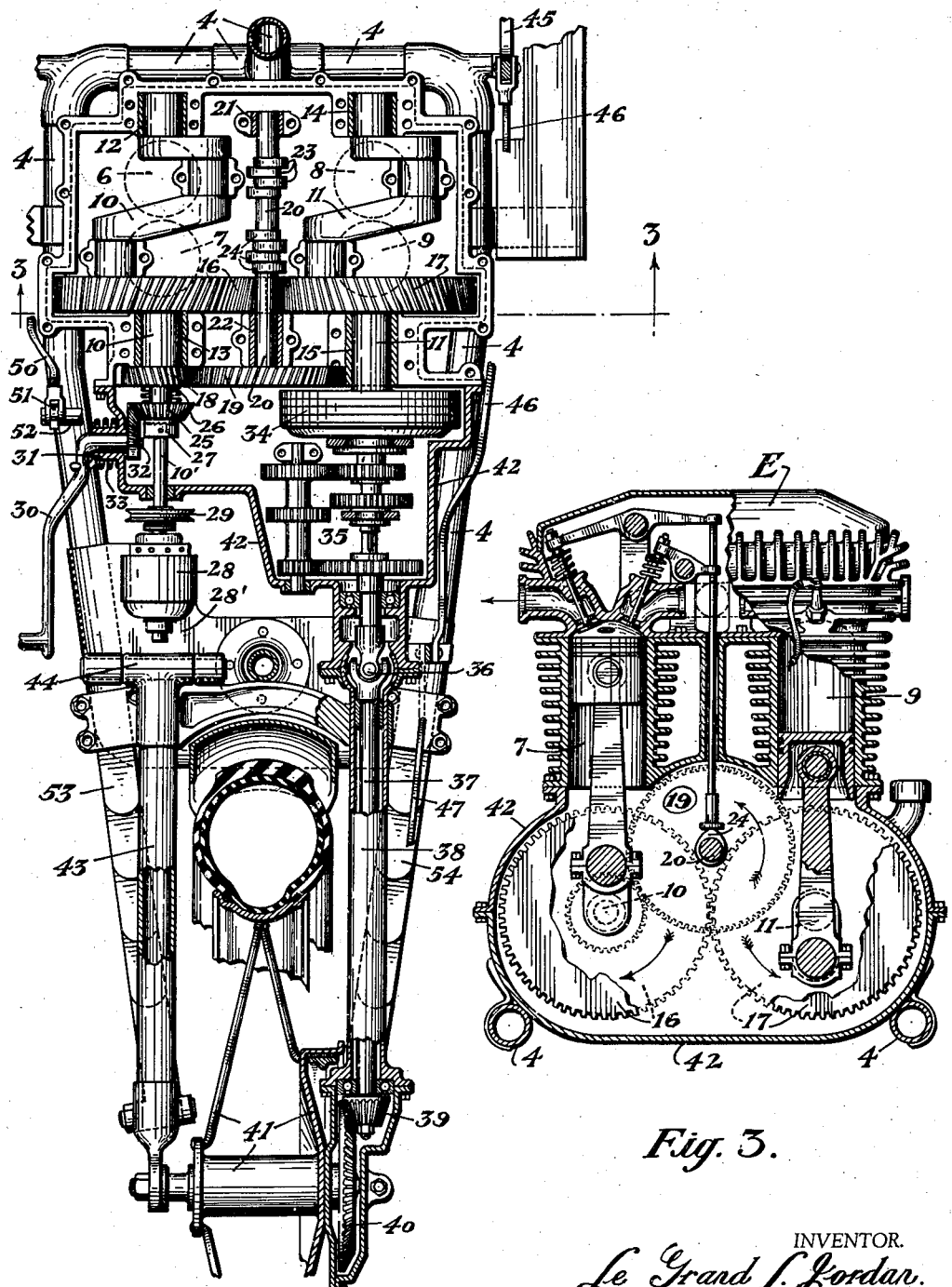
Figure 2 is a plan view, with the upper portion of the housing removed and with parts broken away and shown in section.
Figure 3 is a cross sectional view taken on line 3—3 of Fig. 2.

Referring to Figs. 2 and 3, I have shown a four cylinder engine, designated as a whole E, with four cylinders indicated in light broken line circles in Fig. 2, and designated 6 and 7, and 8 and 9, cylinders 6 and 7 constituting one pair at one side of the median line of the structure, and cylinders 8 and 9 constituting the other pair at the other side of the median line of the structure, the twin crank shafts, designated 10 and 11, having suitable bearings, as 12 and 13, and 14 and 15.

Mounted on said crank shafts are two combination fly wheels and gears, 16 and 17, in mesh with each other and turning in opposite directions, as will be understood from Fig. 3.

Also mounted on the crank shaft 10, outside of the bearing 13, is a pinion 18 which meshes with the gear 19, mounted on a cam shaft 20, having bearings 21 and 22, and provided with the usual valve operating cams, designated 23 and 24.

A starter pedal or crank 30 is mounted in a suitable bearing at 31, and is provided on its inner end with a segmental gear 32, which meshes with the beveled pinion 25 during the starting operation, said starter pedal 30 being normally moved to its upper neutral position by means of a coiled spring 33. The pinion 25 turns freely on a reduced portion of crank shaft 10, and is normally pressed rearwardly by a coiled spring 26, so as to engage the hub of said gear 25 with a toothed or ratchet like connection on a collar 27 secured to an extension 10' of said crank shaft 10, thus transmitting power from the starter pedal 30 to the shaft 10 in the starting operation when said pedal 30 is forced down by the weight of the operator. The end of said shaft extension 10' is connected with a magneto 28, supported upon a suitable platform 28', supported between the side frame members 4—4, as clearly indicated. Said shaft extension 10' is also provided with a driving pulley 29 for driving the usual generator, not shown.

Referring now to the other crank shaft 11, there is mounted thereon a clutch 34, of any suitable type, and a transmission set of gears, designated as a whole 35, and being of standard type and connecting the crank shaft 11, in straight alignment, through a universal joint 36, with a drive shaft 37, suitably housed in the tubular frame member 38, said drive shaft being provided at its rear end with a beveled pinion 39, in mesh with a beveled gear 40 on the rear wheel 41, as clearly indicated in Fig. 2 of the drawings.

The crank shafts 10 and 11, the combination fly wheels 16 and 17, the starter mechanism, the clutch 34, the transmission gears 35, the universal joint 36, and the drive shaft 37, are all housed in suitable castings or housing, designated as a whole 42, and seen in side elevation in Fig. 1.

A companion rear frame member 43, Fig. 2, opposite the frame member 38, is hingedly connected as at 44 to the main frame structure, and turns on an axis in transverse alignment with the universal joint 36. This makes it possible for the rear end of the structure to absorb or neutralize much of the destructive road vibration or jarring which would otherwise be transmitted to the motor and rider.

With the rigid frames in use, the road vibration frequently causes the motor cycle to bounce and jump to such an extent that the rear wheel loses much of its traction and consequently much of its propulsion force. With my improved structure, the hinged rear frame section and the rear wheel responds with shorter vibrations and with much better traction of said rear wheel with the road and therefore makes for greater efficiency and greater safety.

A very important feature of my invention is the arrangement of the cylinders in pairs, at opposite sides of the median line of the whole structure, with twin crank shafts, spaced at opposite sides of said median line, and with a clutch, the transmission gears and the drive shaft in straight alignment to the driving gear connection with the rear wheel, which alignment is parallel with the median line of said frame structure. This is believed to be new and makes for a better balance in a motor cycle. No off-set gear is required in the transmission and no angularly disposed drive shaft.

The starter shaft, with its connection with the magneto, is in alignment with crank shaft 10, and is, therefore in parallel relationship with the drive shaft alignment at the other side of said median line.

The usual brake pedal is designated 45, and is seen in Figs. 1 and 2, with connecting links, 46 and 47, to the brake-operating arm 48. The usual clutch operating pedal, designated 49, is seen in Fig. 1, but is on the opposite side of the structure from the brake pedal, and its connecting rod or link is designated 50, and is shown in Fig. 2, connected with a lever 51, on the clutch operating shaft 52, only a portion of which is shown to avoid confusion. It is to be understood that any type of clutch and clutch operating connections can be used.

The rearward end of that portion of the frame structure which supports the engine is supported by means of two leaf spring units, designated, respectively, 53 and 54, and secured at their forward, large ends, to the rear end of said main frame, near the universal joint 36, and at their rear ends supported in depending links or shackles, as 55.

Many of the usual and standard elements have not been before referred to, such as the tank 56, carburetor 57, exhaust pipe 58, and gear shift lever 59, for the reason that they form no part of the invention except as general units, of standard equipment, and which need not be described in detail.

By arranging the cylinders in pairs, two on each side of the median line of the structure, with one cylinder of each pair behind the other, two of said cylinders are directly exposed to the cooling effect of the air, but where four cylinders are used in alignment, as in present practice, there is difficulty in cooling the rear cylinders. This arrangement also makes it possible to use twin crank shafts geared together and rotating in opposite directions, which takes care of the objection of side thrust or torque due to the rapid acceleration of the engine.

By arranging the starter so that it operates directly on a crank shaft, I avoid the serious objection to the old starter which is applied through the transmission and operates on the engine only through the clutch, thus making it necessary for the clutch to be engaged before the starter has any effect upon the engine. The clutch must then be disengaged and the transmission engaged and the clutch reengaged before the machine can get in motion. This very materially reduces the time of a get-away from a standing start, which is important with motor cycle officers. My new arrangement avoids all unnecessary operation and makes a quick get-away possible.

While I have shown and described in detail one particular construction and arrangement of the parts of a motor cycle embodying my invention, I am aware that other embodiments of my invention can be made without departing from the spirit thereof and I do not, therefore, limit the invention to the particular showing made, except as I may be limited by the hereto appended claims.

I claim:

1. In a motor cycle, a frame structure, an engine having cylinders arranged on opposite sides of the median line of said frame structure, twin crank shafts connected therewith and in parallel relationship with each other at opposite sides of said median line, a drive shaft parallel with, and at one side of, said median line and connected with one of said crank shafts for driving said motor cycle, and a starter mechanism connected with the other of said crank shafts and operable to start said engine.

2. In a motor cycle, a frame structure, an engine having cylinders arranged at opposite sides of the median line of said frame structure, twin crank shafts connected therewith at opposite sides of said median line and geared together to turn in opposite directions, driving connections from one of said crank shafts for driving said motor cycle, and a starter mechanism connected with the other of said crank shafts and operable to start said engine.

3. In a motor cycle, a frame structure, an engine having cylinders arranged at opposite sides of the median line of said frame structure, twin crank shafts connected therewith in parallel relationship with each other and at opposite sides of said median line and geared directly together, driving connections from one of said crank shafts for driving said motor cycle, said driving connections including therein a clutch mechanism and shiftable transmission gears, and a starter mechanism connected with the other of said crank shafts and operable to start said engine.

4. In a motor cycle, a frame structure with front and rear wheels therein, said frame structure having a rear portion hingedly connected with the frame proper, said rear wheel being mounted in said rear hinged frame portion, whereby the rear wheel and said hinged frame portion can vibrate relative to the main frame structure, an engine supported in the front frame structure and having cylinders at the opposite sides of the median line of said frame, twin crank shafts connected with said cylinders and in parallel relationship at opposite sides of said median line, a drive shaft connection in alinement with and from one of said crank shafts to said rear wheel, a universal joint in said drive shaft, and a starter connected with the other of said crank shafts, and operable to start said engine.

5. In a motor cycle, a frame structure having front and rear wheels therein, said frame structure having two parts hinged together forwardly of the rear wheel, an engine having cylinders at opposite sides of the median line of said frame structure and mounted in the front part of said frame structure, twin crank shafts in parallel relationship at opposite sides of said median line and connected, respectively with said cylinders, said crank shafts being geared directly together, drive shaft connections from one of said crank shafts rearwardly in line with the axis thereof to the rear wheel of said motor cycle; and a starter mechanism connected with the other of said crank shafts and operable to start said engine.

6. In a motor cycle, a frame structure hinged intermediate its ends and having front and rear wheels in the different portions thereof, an engine having cylinders at opposite sides of the median line of said frame structure, in the front portion thereof, twin crank shafts at opposite sides of said median line and having their axes in parallel relationship therewith and connected, respectively with said cylinders, a drive shaft from one of said crank shafts to said rear wheel, said connections including a clutch and transmission gears, and a universal joint in transverse alinement with the hinge joint of said frame structure, and a starter mechanism connected with the other of said crank shafts, and operable for starting said engine.

7. In a motor cycle, a frame structure hinged intermediate its ends and having front and rear wheels in the different portions thereof, an engine having cylinders at opposite sides of the median line of said frame structure, in the front portion thereof, twin crank shafts at opposite sides of said median line and having their axes in parallel relationship therewith and connected, respectively, with said cylinders, shaft driving conections from one of said crank shafts and in alinement therewith to said rear wheel, said connections including therein a clutch mechanism and a set of transmission gears and a universal joint positioned in transverse alinement with the hinge in said frame structure, and a starter mechanism connected with the other of said crank shafts, and operable to start said engine.

8. A motor cycle having a frame, two cylinders at each side of the median line of said frame, the cylinders of each pair being arranged one behind the other longitudinally of said frame, twin crank shafts at opposite sides of said median line and having their axes in parallel relationship therewith, said crank shafts being geared directly together to turn in opposite directions, driving connections from one of said crank shafts to drive said motor cycle, and starter mechanism connected with the other of said crank shafts for starting said engine.

9. A motor driven vehicle having a frame structure, an engine supported therein, the cylinders of said engine being arranged in pairs opposed to each other laterally of said frame structure, twin crank shafts, one for each pair, positioned with their axes parallel with each other and with the median line of said frame structure, said shafts being geared together with combination fly wheels and gears in mesh with each other, driving connections from one of said crank shafts, in alignment with the axis thereof, for driving said vehicle, and a starter mechanism connected with the other of said crank shafts and operable for starting said engine.

10. A motor driven vehicle having a frame structure, an engine supported therein, the cylinders of said engine being arranged in pairs opposed to each other laterally of said frame structure, the cylinders of each pair being arranged one behind the other longitudinally of said vehicle, twin crank shafts, one for each pair of cylinders, positioned with their axes parallel with each other, said shafts being geared together to turn in opposite directions, driving connections from one of said crank shafts, in alinement with the axis thereof, for driving said vehicle, said driving connections including therein a clutch and a set of transmission gears, and a starter mechanism connected with the other of said crank shafts and operable thereon for starting said engine.

11. A motor cycle frame structure having a front wheel and a rear wheel mounted therein, said frame structure being hinged forwardly of said rear wheel, whereby said rear wheel and the rear portion of said frame structure can vibrate relative to the forward part of said frame, an engine mounted in the forward part of said frame, said engine including twin crank shafts in parallel relationship with each other and with the median line of said frame structure, said crank shafts having combination fly wheels and gears in mesh with each other to turn in opposite directions, driving connections from one of said crank shafts to said rear wheel, and starter mechanism connected with the other of said crank shafts and operable for starting said engine.

LE GRAND L. JORDAN.